United States Patent
Hyrenbach et al.

(10) Patent No.: US 9,343,881 B2
(45) Date of Patent: May 17, 2016

(54) GAS-INSULATED SWITCHGEAR

(71) Applicant: ABB Technology AG, Zurich (CH)

(72) Inventors: Maik Hyrenbach, Duisburg (DE); Kasimir Mai, Düsseldorf (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/770,686

(22) Filed: Feb. 19, 2013

(65) Prior Publication Data

US 2013/0163165 A1 Jun. 27, 2013

Related U.S. Application Data

(63) Continuation of application No. 11/628,995, filed as application No. PCT/EP2005/006079 on Jun. 7, 2005.

(51) Int. Cl.
*H02B 13/045* (2006.01)
*H02B 13/035* (2006.01)
*H01H 9/16* (2006.01)
*H01H 31/00* (2006.01)
(Continued)

(52) U.S. Cl.
CPC .......... *H02B 13/045* (2013.01); *H02B 13/0356* (2013.01); *H01H 9/16* (2013.01); *H01H 31/003* (2013.01); *H01H 2001/0021* (2013.01); *H01H 2009/0083* (2013.01); *H01H 2009/0292* (2013.01)

(58) Field of Classification Search
CPC .... H02B 13/045; H02B 13/0356; H01H 9/16; H01H 31/003; H01H 2001/0021; H01H 2009/0292; H01H 2009/0083
USPC .................................... 361/61, 612, 618–621
See application file for complete search history.

(56) References Cited

U.S. PATENT DOCUMENTS 3,339,118 A * 8/1967 Harner et al. ................. 361/609
3,358,104 A   12/1967 Cromer et al.
(Continued)

FOREIGN PATENT DOCUMENTS

CA   2567781 C   8/2010
CA   2570772 C   8/2010
(Continued)

OTHER PUBLICATIONS

Canadian Court Filing, Amended Statement of Defence and Counterclaim, *ABB Technology AG v. Hyundai Heavy Industries Co.,Ltd.* Court File No. T-735-11, Dec. 16, 2011, Canada.
Canadian Court Filing, Amended Statement of Claim, *ABB Technology AG v. Hyundai Heavy Industries Co., Ltd.* Court File No. T-735-11, Apr. 28, 2011, Canada.
ABB AG,Calor Emag Medium Voltage Products, ZX2 Gas-insulated medium voltage switchgear,DEABB/PT-PM 2356 06E(brochure) printed in Ratingen,Germany, Jul. 8, 2000. Schedule E.
(Continued)

*Primary Examiner* — Anatoly Vortman
(74) *Attorney, Agent, or Firm* — Taft Stettinius & Hollister LLP

(57) ABSTRACT

A gas-insulated switchgear assembly is provided that includes a housing having an interior containing insulating gas. A disconnector is disposed in the housing and includes a movable contact, as well as fixed contacts that are spaced apart and arranged linearly in a direction perpendicular to a wall of the housing. The movable contact has a colored or topographical marking and is linearly movable among a plurality of positions. The wall of the housing is provided with an inspection window that permits a person to see the colored or topographical marking in relation to the fixed contacts, thereby permitting the person to determine the position of the movable contact.

33 Claims, 2 Drawing Sheets

(51) Int. Cl.
 H01H 1/00 (2006.01)
 H01H 9/00 (2006.01)
 H01H 9/02 (2006.01)

(56) References Cited

U.S. PATENT DOCUMENTS

| | | | |
|---|---|---|---|
| 3,359,390 | A | 12/1967 | Frowein |
| 3,566,062 | A | 2/1971 | Meier et al. |
| 3,681,549 | A | 8/1972 | Schmitz et al. |
| 3,749,869 | A | 7/1973 | Imataki |
| 3,966,297 | A | 6/1976 | Vigreux et al. |
| 4,208,556 | A | 6/1980 | Patel et al. |
| 4,234,006 | A | 11/1980 | Cookson |
| 4,555,603 | A | 11/1985 | Aoyama |
| 4,709,291 | A | 11/1987 | Eggert et al. |
| 4,821,140 | A | 4/1989 | Takeuchi et al. |
| 4,821,141 | A | 4/1989 | Torimi et al. |
| 5,578,805 | A † | 11/1996 | Berger et al. |
| 5,721,412 | A † | 2/1998 | Schifko et al. |
| 5,864,107 | A | 1/1999 | French et al. |
| 6,040,538 | A | 3/2000 | French et al. |
| 6,063,997 | A | 5/2000 | Endo et al. |
| 6,114,642 | A * | 9/2000 | French et al. ............... 200/293 |
| 6,501,572 | B1 | 12/2002 | Poth et al. |
| 6,556,428 | B1 | 4/2003 | Takahoshi et al. |
| 6,624,372 | B1 | 9/2003 | Ogawa et al. |
| 6,697,247 | B1 | 2/2004 | Meinherz et al. |
| 7,275,832 | B2 | 10/2007 | Sato |
| 7,429,710 | B2 † | 9/2008 | Gutalj et al. |
| 2002/0116092 | A1 | 8/2002 | Hamamatsu et al. |
| 2009/0296320 | A1 | 12/2009 | Fink et al. |
| 2012/0247933 | A1* | 10/2012 | Raorane et al. ............... 200/317 |

FOREIGN PATENT DOCUMENTS

| | | | | |
|---|---|---|---|---|
| DE | 2607158 | A1 | 8/1977 | |
| DE | 4243046 | A1 | 6/1994 | |
| DE | 19600668 | C2 | 7/1997 | |
| DE | 29806211 | U1 | 7/1998 | |
| DE | 102008000165 | A1 | 9/2008 | |
| EP | 0122595 | † | 10/1984 | |
| EP | 0122595 | A1 | 10/1984 | |
| FR | 2818452 | A3 | 6/2002 | |
| GB | 599421 | A | 3/1948 | |
| GB | 2235583 | A * | 3/1991 | ............... H02B 1/26 |
| JP | 02032707 | A | 2/1990 | |
| JP | 03261314 | A | 11/1991 | |
| JP | 06-335126 | A | 2/1994 | |
| JP | 08-223718 | A | 8/1996 | |
| JP | 2001145219 | A | 5/2001 | |
| WO | 9826483 | A2 | 6/1998 | |
| WO | 9949484 | A1 | 9/1999 | |
| WO | 0069041 | A1 | 11/2000 | |
| WO | 2005122352 | A1 | 12/2005 | |

OTHER PUBLICATIONS

Donald G. Fink & H.Wayne Beaty, Standard Handbook for Electric Engineers, 14th edition, McGraw & Hill Companies, printed in the U.S.A. published 2000. Section 17-49 to 17-54, ISBN 0-07-022005-0. Schedule K.
Alstom T&D SA, Gas-Insulated Switchgear -245 kV, Type B105,(brochure) Cedex, France May 1999, pp. 5-6. Schedule L.
ABB Catolog N-H5194 E, Type tested metal-enclosed SF6 compact switchgear cubicle system up to 24kV, Type RGC ACC. to IEC Publications 265,298,420,129 and 56. pp. 2, 4. May 1996, Schedule M.
IEEE, Guide for Gas-Insulated Substations, Standard C37.122.1, section 4.1.2.k, published 1994, New York, NY, U.S.A. Schedule P.
IEC,International Standard 62271-200, High-voltage switchgear and controlgear-Part 200: AC-metal enclosed switchgear and controlgear for rated voltages above 1kV and up to and including 52 kV, first edition dated Nov. 2003, Geneva, Switzerland Sections 5.102.1 and 5.102.4, 5.103.2. And 5.104. Schedule I.
First Office Action from CA2567781, Feb. 15, 2009.
Response to Office Action from CA2567781, Aug. 14, 2009.
K.C.Agrawal,Industrial Power Engineering and Applications Handbook,(Book), Section 13 pp. 335-338, printed 2001. Great Britain, Schedule O.
Cussac, Yolaine, International Preliminary Report on Patentability, Dec. 28, 2006,The International Bureau of WIPO, Geneva Switzerland.
Overdijk, J, International Searching Authority, Received Nov. 15, 2005, European Patent Office, NL-2280.
Amended Amended Statement of Claim by ABB Technology AG, et al., Federal Court of Canada, Court File No. T-735-11, Aug. 3, 2012 (concerning Canadian counterpart patent No. XYZ).
Thrice Amended Statement of Defence and Counterclaim by Hyundai Heavy Industries Co., Ltd., Federal Court of Canada, Court File No. T-735-11, May 28, 2013.
Expert Statement of Stig Nilsson, *ABB Technology AG, et al.*, v. *Hyundai Heavy Industries Co., Ltd.*, Federal Court of Canada, Court File No. T-735-11, Mar. 14, 2013.
Appendices A-D of the Expert Statement of Stig Nilsson, *ABB Technology AG, et al.*, v. *Hyundai Heavy Industries Co., Ltd.*, Federal Court of Canada, Court File No. T-735-11, Mar. 14, 2013.
Exhibits 1-5 of the Expert Statement of Stig Nilsson, *ABB Technology AG, et al.*, v. *Hyundai Heavy Industries Co., Ltd.*, Federal Court of Canada, Court File No. T-735-11, Mar. 14, 2013.
Exhibits 6-32 of the Expert Statement of Stig Nilsson, *ABB Technology AG, et al.*, v. *Hyundai Heavy Industries Co., Ltd.*, Federal Court of Canada, Court File No. T-735-11, Mar. 14, 2013.
Expert Statement of Tim Molony (with exhibits), *ABB Technology AG, et al.*, v. *Hyundai Heavy Industries Co., Ltd.*, Federal Court of Canada, Court File No. T-735-11, Mar. 14, 2013.
Expert Statement of David Leone, *ABB Technology AG, et al.*, v. *Hyundai Heavy Industries Co., Ltd.*, Federal Court of Canada, Court File No. T-735-11, dated May 15, 2013.
Appendices 40-41 of the Expert Statement of David Leone, *ABB Technology AG, et al.*, v. *Hyundai Heavy Industries Co., Ltd.*, Federal Court of Canada, Court File No. T-735-11, dated May 15, 2013.
Appendices 42-43 of the Expert Statement of David Leone, *ABB Technology AG, et al.*, v. *Hyundai Heavy Industries Co., Ltd.*, Federal Court of Canada, Court File No. T-735-11, dated May 15, 2013.
Appendices 44-49 of the Expert Statement of David Leone, *ABB Technology AG, et al.*, v. *Hyundai Heavy Industries Co., Ltd.*, Federal Court of Canada, Court File No. T-735-11, dated May 15, 2013.
Appendices 50-52 of the Expert Statement of David Leone, *ABB Technology AG, et al.*, v. *Hyundai Heavy Industries Co., Ltd.*, Federal Court of Canada, Court File No. T-735-11, dated May 15, 2013.
Reasons for Judgment and Judgment, *ABB Technology AG, et al.*, v. *Hyundai Heavy Industries Co., Ltd.*, Federal Court of Canada, Court File No. T-735-11, Sep. 11, 2013.
Notice of Appeal, *ABB Technology AG, et al.*, v. *Hyundai Heavy Industries Co., Ltd.*, Federal Court of Appeal of Canada, Court of Appeal File No. A-346-13, Oct. 11, 2013.
Memorandum of Fact and Law of the Appellants, *ABB Technology AG, et al.*, v. *Hyundai Heavy Industries Co., Ltd.*, Federal Court of Appeal of Canada, Court of Appeal File No. A-346-13, Feb. 12, 2014.
Responding Memorandum of Fact and Law of the Respondent, *ABB Technology AG, et al.*, v. *Hyundai Heavy Industries Co., Ltd.*, Federal Court of Appeal of Canada, Court of Appeal File No. A-346-13, Mar. 12, 2014.
Reasons for Judgment, *ABB Technology AG, et al.*, v. *Hyundai Heavy Industries Co., Ltd.*, Federal Court of Appeal of Canada, Court of Appeal File No. A-346-13, Aug. 18, 2015.
U.S. Pat. No. 3,217,211; Alexander R. Norden; Issued on Nov. 9, 1965.†
U.S. Pat. No. 3,657,495; Charamel et al.; Issued on Apr. 18, 1972.†

* cited by examiner
† cited by third party

GAS-INSULATED SWITCHGEAR

CROSS-REFERENCE TO RELATED APPLICATION

This application is a continuation of U.S. patent application Ser. No. 11/628,995, filed on Jul. 30, 2008, which is a national stage application of PCT Application No. PCT/EP2005/006079 filed on Jun. 7, 2005, which claims priority from German Application No. 10 2004 028 275.7 filed on Jun. 9, 2004.

BACKGROUND OF THE INVENTION

The invention relates to a gas-insulated switchgear assembly, in particular a gas-insulated medium-voltage switchgear assembly.

In addition to a circuit breaker, which is usually installed in a fixed manner, electrical switchgear assemblies, in particular medium-voltage switchgear assemblies, also contain a disconnector, which is arranged, for example, between the circuit breaker and the bus bar current path. This disconnector can assume two or three positions: connected position, disconnected position and possibly grounding position. This disconnector is therefore in the form of a two-position or three-position disconnector.

In the connected position, a connection to the voltage-carrying busbar is produced and, in the grounding position, a connection to ground is produced, for example. In the disconnected position, the movable contact piece of the disconnector is located in a central position between the connected position and the grounding position.

Conventional three-position disconnectors are known as linear-travel switches or knife switches.

In general, disconnectors are used as an independent device in the same gas area as the circuit breaker or in a separate gas area, in particular in the case of double-busbar arrangements. The electrical part of these devices is always part of the gas area and is connected to the drive by means of a gas-tight bushing, which drive is usually located outside the gas area and is generally in the form of a mechanical drive in medium-voltage applications.

In the known double-busbar arrangements, firstly a three-position disconnector and secondly a two-position disconnector (no grounding position) are located in the two separate busbar areas.

Grounding of the outgoing section for the safety of operating personnel, for example during maintenance or installation work, takes place via the grounding position of the three-position disconnector and of the connected circuit breaker. Then, possibly further fitted grounding switches without any switching capacity can be introduced in order to allow for subsequent opening of the circuit breaker. Corresponding electrical and/or mechanical latching devices prevent both the grounding position of the three-position disconnector from being left unintentionally and disconnection of the circuit breaker (if no parallel grounding connection has been connected) and therefore ensure safe grounding of the outgoing section.

The switching positions are transmitted to position displays by means of elements which are mechanically coupled to the drive and are signaled by means of auxiliary switches or proximity sensors. In addition, further positions (such as the grounding position, for example) can be signaled in contactless fashion via reed contacts, which results in redundant position signaling with correspondingly increased reliability.

The visual checking of the switching position prescribed in some application areas by means of direct viewing contact of the switching device in the interior of a gas-insulated switchgear assembly is not possible depending on the construction, position and design, or the positions cannot be clearly identified.

SUMMARY OF THE INVENTION

The invention is generally directed toward two-position and three-position disconnectors in gas-insulated switchgear assemblies.

The present invention is more specifically directed toward a gas-insulated switchgear assembly, wherein an inspection window is introduced/fitted in the housing of the switchgear assembly such that the positions of the switching contact elements can be seen from outside the housing directly or indirectly via optical means. Owing to the inspection it is possible to make sure of the switching state achieved or desired. This would be the test, for example, as to whether the disconnector has also actually arrived at the grounded position. The isolated line would thus be demonstrably safe in a working environment.

One further advantageous refinement provides that at least the respective movable switching contact element is provided with a colored or topographical marking, which changes its position with respect to a fixed marking or reference structure depending on the switching position. It is thus easily possible for the presently reached switching position to be tested.

These mentioned advantages only make sense when, owing to a refinement according to the invention, the inspection window is arranged in the housing such that, as a result, the hermetic seal of the housing is maintained. An important factor here is the functional maintenance of the conditions of the gas-insulated switchgear assembly even when an inspection window is introduced. In a corresponding manner, the inspection window can therefore be introduced in a sealed manner into the housing.

In order that the inspection window does not become the bursting element in the event of a pressure overload, in one refinement according to the invention a pressure overload triggering device is arranged within the housing and is triggered markedly before the bursting limit of the inspection window.

In order to permit visual checking of the switching state even when, owing to design reasons, there is no visual access to the switching contact elements of the disconnector, the invention proposes that the optical means comprise at least one mirror, via which the marking or markings can be seen.

One further advantageous refinement provides that, in order to inspect the switching positions in a polyphase arrangement, the position of the inspection window and of the markings is selected in relation to one another in such a way that the latter can be inspected safely.

Furthermore, for a polyphase arrangement one advantageous refinement provides that, in order to inspect the switching positions, one or more inspection windows are provided.

Finally, the design is such that illumination means are provided outside the housing which illuminate the markings for inspection thereof, in order to make it possible to clearly identify the switching state even in poor lighting conditions.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
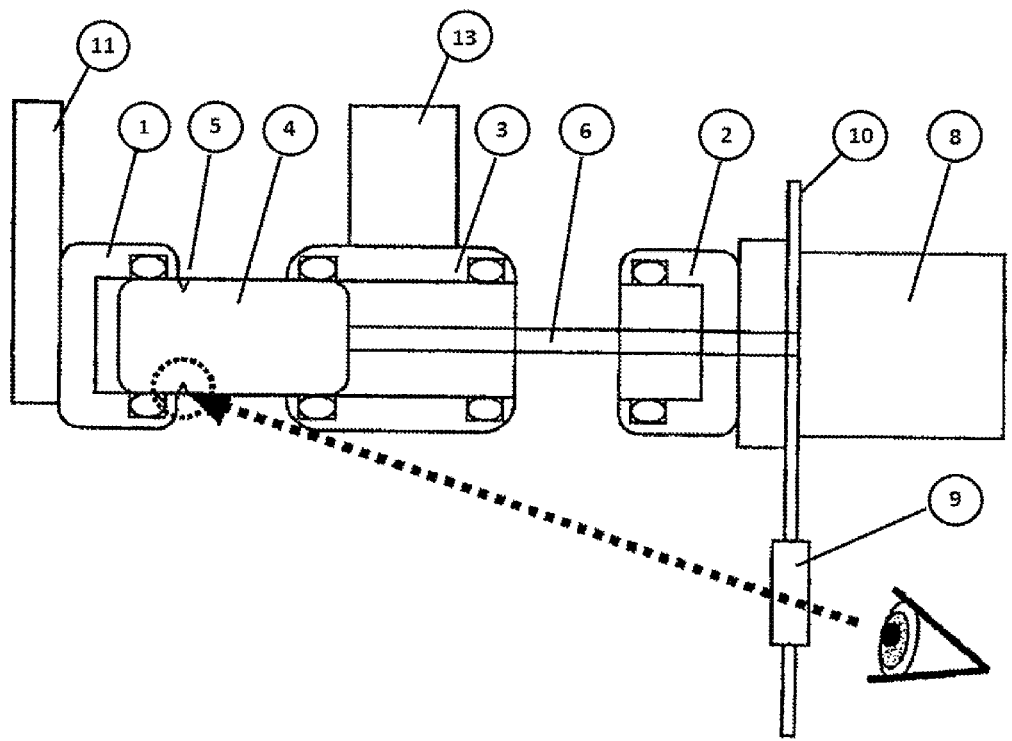
FIG. 1 shows a switching position assessment of a disconnector in an ON position.

The visual switching position assessment, see FIG. 1, makes it possible to check the switching state of the switching device located in the interior of a gas-insulated switchgear assembly easily through an inspection window 9 in the encapsulating wall of the housing 10, which is only illustrated partially here. The switching position, i.e. the position of the movable contact 4 in relation to the fixed contacts 1, 2 and 3, is assessed by means of a marking 5 on the, for example, cylindrical contact piece 4. The respective switching position is in this case clearly associated with the position of the marking 5 or other prominent regions of the movable contact in relation to the fixed contacts.

Actuation takes place via the spindle 6, which is connected to the drive 8. The switching position illustrated here is the disconnector ON position.

There are certainly many possibilities for the sensory detection of an end position. In the case of switchgear assemblies which are used in the medium-voltage range, voltages of up to 40 kV are present. Since such switchgear assemblies also serve the purpose, inter alia, of isolating line regions for maintenance and extension work, safe shutdown is without doubt an extremely important requirement for the safety of human life.

In order to be able to determine end positions and disconnection positions, sensors are also used. In this case, however, it is necessary to take into account the fact that even sensors cannot ensure 100% safety. For this reason, the safety systems for clearly evaluating the switching positions should have a redundant design in order to ensure maximum safety provided by the additional visual inspection possibility.

Figure 2:
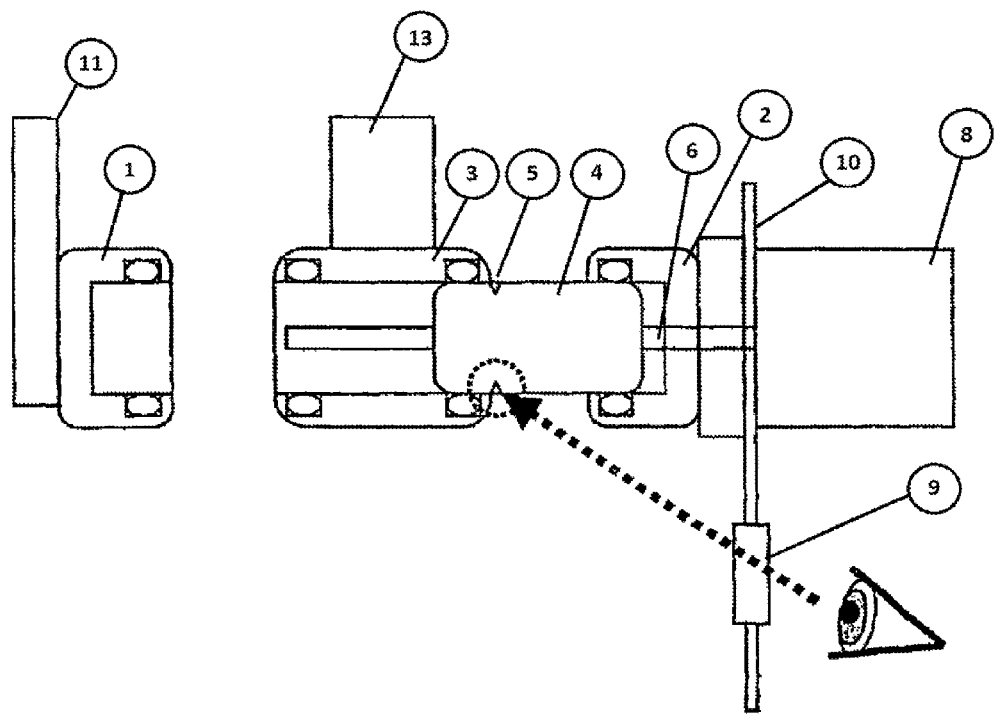
FIG. 2 shows a switching position assessment of a disconnnector in a grounding position.

FIG. 2 shows the switching position in the grounding device ON position. This position, as is also the case for any other position, can be inspected in the manner described. In this case, this switching position and the possibility for visually inspecting this position according to the invention is of considerable importance in terms of safety.

The visual switching position assessment is characterized by a peripheral or spatially limited marking, which is colored or identified by machining, on the movable contact of a switching device, which marking, in a switching position (disconnector ON or grounding device ON) in a previously determined position in relation to the fixed contacts or other reference points, which do not change in terms of their position, can be observed and assessed through an inspection window directly or indirectly via a mirror or a camera.

The marking cannot become detached and is fitted in a fixed position on the contact such that the reference to the switching position is absolutely clear.

The position of the marking ensures that the end position of the switching position has been reached within the permissible tolerances.

The observation takes place in three-phase systems through a common inspection window or a plurality of inspection windows which close the encapsulation in a gastight manner.

Illumination takes place via separately fitted inspection windows by means of fixedly fitted luminous means or by means of movable light sources through the observation window or additional windows.

These effects mean that there is a possibility for directly inspecting the positions of the switching elements, which is possible despite a switchgear assembly which in most cases is even hermetically enclosed.

What is claimed is:

1. A gas-insulated switchgear assembly, comprising:
   (a.) a housing having an interior containing insulating gas, the housing including a wall;
   (b.) a disconnector disposed in the interior of the housing and comprising:
      a first, a second and a third fixed contacts that are spaced apart and arranged linearly in a direction perpendicular to the wall;
      a movable switching element having a peripheral or spatially limited marking, the switching element being linearly movable between a first position, wherein the movable switching element touches the first fixed contact and touches and is at least partially surrounded by the second fixed contact, but does not touch the third fixed contact, and a second position, wherein the movable switching element touches and is at least partially surrounded by the second fixed contact and touches the third fixed contact, but does not touch the first fixed contact; and
   (c.) an inspection window through which a person may view the disconnector, the inspection window being located in the wall of the housing and being positioned to: (i.) permit the person to see the peripheral or spatially limited marking in relation to the first fixed contact when the switching element is in the first position so as to permit the person to determine that the switching element is in the first position, and (ii.) permit the person to see the peripheral or spatially limited marking in relation to the second fixed contact when the switching element is in the second position so as to permit the person to determine that the switching element is in the second position.

2. The gas-insulated switchgear assembly of claim 1, further comprising a drive connected by a spindle to the switching element, the drive being operable to move the switching element.

3. The gas-insulated switchgear assembly of claim 2, wherein the drive is located outside the housing.

4. The gas-insulated switchgear assembly of claim 1, wherein the switching element is cylindrical.

5. The gas-insulated switchgear assembly of claim 4, wherein the peripheral or spatially limited marking extends around the periphery of the switching element.

6. The gas-insulated switchgear assembly of claim 5, wherein the peripheral or spatially limited marking is a groove.

7. The gas-insulated switchgear of claim 4, wherein when the switching element is in the first position, a first end portion of the switching element is disposed inside the first fixed contact, and wherein when the switching element is in the second position, the first end portion is disposed inside the second fixed contact.

8. The gas-insulated switchgear of claim 7, wherein the peripheral or spatially limited marking is disposed about flush with an opening of the first fixed contact when the switching element is in the first position, and wherein the peripheral or spatially limited marking is disposed about flush with an opening of the second fixed contact when the switching element is in the second position.

9. The gas-insulated switchgear assembly of claim 1, wherein the first position is a connected position and the second position is a grounded position.

10. The gas-insulated switchgear of claim 9, wherein the switching element is further movable to a disconnected position located between the connected position and the grounded position.

11. The gas-insulated switchgear of claim 1, wherein the housing with the inspection window is hermetically sealed.

12. The gas-insulated switchgear of claim 1, further comprising another inspection window.

13. The gas-insulated switchgear of claim 1, further comprising a pressure overload triggering device disposed within the housing and operable to trigger significantly before a bursting limit of the inspection window.

14. The gas-insulated switchgear of claim 1, further comprising a light disposed outside the housing to illuminate the peripheral or spatially limited marking.

15. The gas-insulated switchgear assembly of claim 1, wherein the gas-insulated switchgear assembly is for three phases of power and the at least one disconnector comprises three disconnectors, and wherein the disconnectors for all three phases can be viewed from a common window, which is the inspection window.

16. The gas-insulated switchgear assembly of claim 15, wherein the gas-insulated switchgear assembly is used for voltages in the medium-voltage range.

17. The gas-insulated switchgear assembly of claim 1, further comprising sensors for determining a position of the disconnector.

18. The gas-insulated switchgear of claim 1, wherein when the switching element is in the first position, a first end portion of the switching element is disposed inside the first fixed contact, and wherein when the switching element is in the second position, the first end portion is disposed inside the second fixed contact.

19. A gas-insulated switchgear assembly, comprising:
(a.) a housing having an interior containing insulating gas, the housing including a wall;
(b.) a linear travel switch disconnector disposed in the interior of the housing and comprising:
a first, a second and a third fixed contact, the first and second contacts including a fixed marking or reference;
a linearly movable switching element operable to move along a line perpendicular to the wall between a first position and a second position, wherein in the first position the switching element touches both the first and second fixed contacts, but does not touch the third fixed contact and wherein in the second position the movable switching element touches and is at least partially surrounded by the second fixed contact and touches the third fixed contact, but does not touch the first fixed contact, the switching element having a peripheral or spatially limited marking that is flush with the marking or reference of the first fixed contact when the movable switching element is in the first position, and is flush with the marking or reference of the second fixed contact when the movable switching element is in the second position; and,
(c.) an inspection window located in the wall of the housing and positioned to: (i.) permit a person to see the peripheral or spatially limited marking as flush with the marking or reference of the first fixed contact when the switching element is in the first position, and (ii.) permit the person to see the peripheral or spatially limited marking as flush with the marking or reference of the second fixed contact when the switching element is in the second position.

20. A gas-insulated switchgear assembly, comprising:
(a.) a housing having an interior containing insulating gas, the housing including a wall;
(b.) at least one linear travel switch disconnector disposed in the interior of the housing and comprising:
a first, a second and a third fixed contact, the first, second and third fixed contacts arranged linearly;
a switching element operable to move linearly between a first position and a second position, wherein in the first position the switching element touches the first contact and touches the second fixed contact, but does not touch the third fixed contact and wherein in the second position the movable switching element touches and is at least partially surrounded by the second fixed contact and touches the third fixed contact, but does not touch the first fixed contact, the switching element having a colored or topographical marking that is visible in a predetermined location relative to the first contact when in the first position and is visible in a second predetermined location relative to the second contact when in the second position; and,
(c.) an inspection window located in the wall of the housing and positioned to: (i.) permit the person to see the colored or topographical marking in relation to the first fixed contact when the switching element is in the first position so as to permit the person to determine that the switching element is in the first position, and (ii.) permit the person to see the colored or topographical marking in relation to the second fixed contact when the switching element is in the second position so as to permit the person to determine that the switching element is in the second position.

21. The gas-insulated switchgear assembly of claim 20, further comprising a drive connected by a spindle to the switching element, the drive being operable to move the switching element linearly.

22. The gas-insulated switchgear assembly of claim 21, wherein the drive is located outside the housing.

23. The gas-insulated switchgear assembly of claim 20, wherein the switching element is cylindrical.

24. The gas-insulated switchgear assembly of claim 23, wherein the colored or topographical marking extends around the periphery of the switching element.

25. The gas-insulated switchgear assembly of claim 24, wherein the colored or topographical marking is a groove.

26. The gas-insulated switchgear of claim 23, wherein when the switching element is in the first position, a first end portion of the switching element is disposed inside the first fixed contact, and wherein when the switching element is in the second position, the first end portion is disposed inside the second fixed contact.

27. The gas-insulated switchgear of claim 26, wherein the colored or topographical marking is disposed about flush with an opening of the first fixed contact when the switching element is in the first position, and wherein the colored or topographical marking is disposed about flush with an opening of the second fixed contact when the switching element is in the second position.

28. The gas-insulated switchgear assembly of claim 20, wherein the first position is a connected position and the second position is a grounded position.

29. The gas-insulated switchgear of claim 28, wherein the switching element is further movable to a disconnected position located between the connected position and the grounded position.

30. The gas-insulated switchgear of claim 20, further comprising a pressure overload triggering device disposed within the housing and operable to trigger significantly before a bursting limit of the inspection window.

31. The gas-insulated switchgear assembly of claim 20, wherein the gas-insulated switchgear assembly is for three phases of power and the at least one disconnector comprises three disconnectors, and wherein the disconnectors for all three phases can be viewed from the inspection window.

32. The gas-insulated switchgear assembly of claim 31, wherein the gas-insulated switchgear assembly is used for voltages in the medium-voltage range.

33. The gas-insulated switchgear of claim 20, wherein when the switching element is in the first position, a first end portion of the switching element is disposed inside the first fixed contact, and wherein when the switching element is in the second position, the first end portion is disposed inside the second fixed contact.

\* \* \* \* \*